United States Patent [19]  
Weise et al.

[11] 4,188,973  
[45] Feb. 19, 1980

[54] CHECK VALVE

[75] Inventors: Irvin B. Weise; Oscar Dane, both of Houston, Tex.

[73] Assignee: Anderson, Greenwood & Co., Houston, Tex.

[21] Appl. No.: 858,080

[22] Filed: Dec. 6, 1977

[51] Int. Cl.² ............... F16K 15/03; F16K 47/02
[52] U.S. Cl. ........................... 137/514; 137/514.7; 137/527.4
[58] Field of Search ................ 251/50, 51, 52; 137/856, 527.4, 514, 514.7, 527, 527.2, 527.6, 527.8

[56] References Cited  
U.S. PATENT DOCUMENTS

| | | | |
|---|---|---|---|
| 1,379,092 | 5/1921 | Fraccascia et al. | 137/514.7 |
| 1,406,799 | 2/1922 | Wood | 137/514 |
| 1,660,588 | 2/1928 | Wishart et al. | 137/856 |
| 2,356,990 | 9/1944 | Getz | 251/152 X |
| 2,717,001 | 9/1955 | Perrault | 137/527.4 X |
| 2,925,827 | 2/1960 | Anderson et al. | 137/527.4 |
| 3,062,232 | 11/1962 | McGay | 137/527.8 X |
| 3,817,278 | 6/1964 | Elliott | 137/527 |
| 3,942,551 | 3/1976 | Schuller et al. | 137/514 |

Primary Examiner—William R. Cline  
Attorney, Agent, or Firm—Vinson & Elkins

[57] ABSTRACT

A check valve having a body with an inlet, an outlet, a valve seat surrounding communication between said inlet and said outlet, a valve chamber in said body communicating with said outlet, a bonnet having a cylinder therein with the open end communicating with said valve chamber where the bonnet is secured to said body, a valve disc resiliently secured to an arm which is pinned to allow the valve disc to be pivoted from a position engaging said valve seat to a position in said valve chamber, a piston in the bonnet cylinder and having a connecting rod secured to said valve disc arm so that said piston reciprocates in said cylinder as said valve disc moves, a port through the piston to allow passage of the fluid flowing through the check valve to flow to opposite sides of the piston as it reciprocates in the cylinder, a reed valve secured to said piston and adapted to substantially close said port during closing movement of said valve disc but allow relatively free flow of fluids through said port during opening movement of the valve disc, a seal ring having sufficient resiliency and being contoured to provide a seal between said piston and said cylinder during reciprocation and tilting of said piston within said cylinder, all moving parts being contained within said valve body and said bonnet, said piston and said valve disc having substantially the same diameter to cancel out effects of back surge.

3 Claims, 5 Drawing Figures

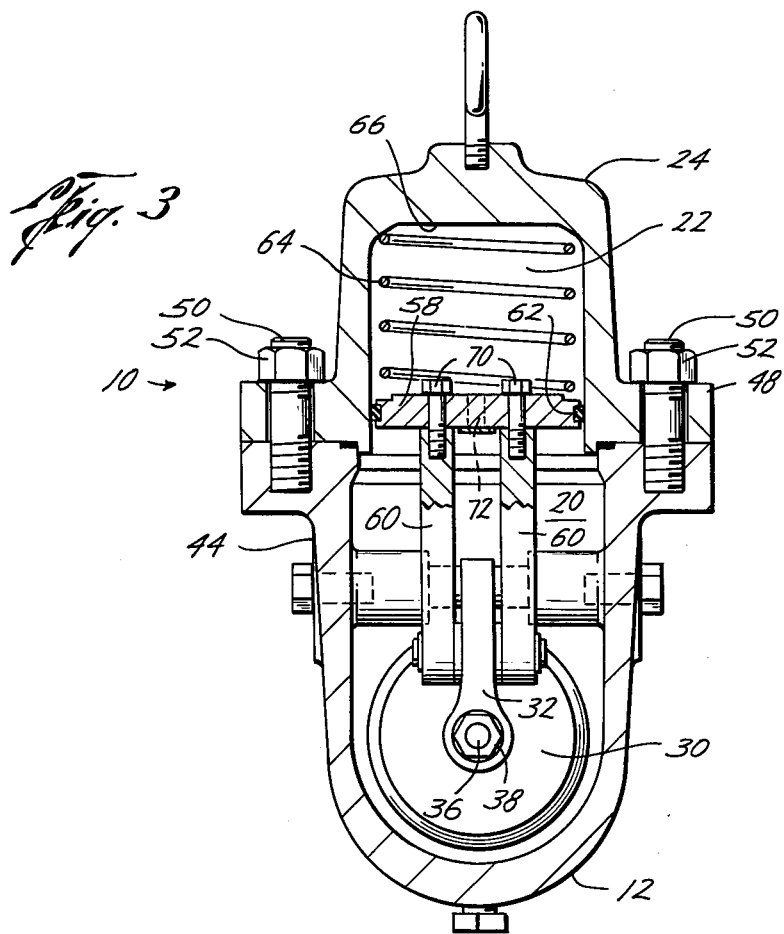
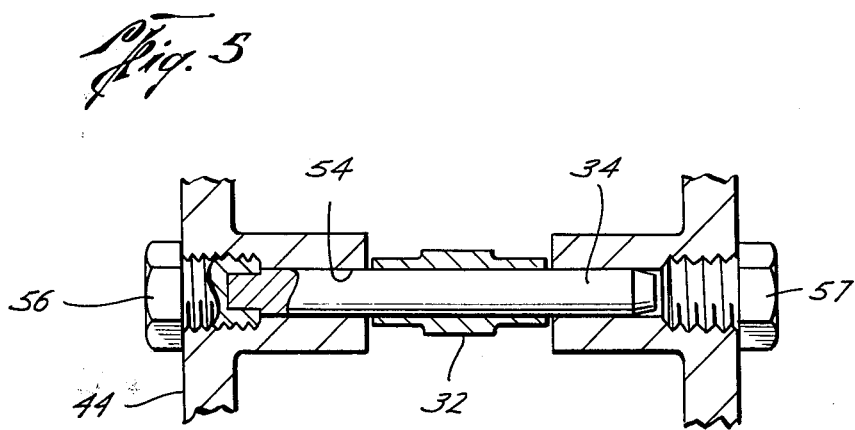

ll# CHECK VALVE

BACKGROUND OF THE INVENTION

Check valves have long been used to allow a substantially free flow of fluids in one direction while preventing flow in the other direction. Many times damping devices have been connected to the moving valve member to ease or slow the movement of the valve member and particularly to avoid slam closing of the valve member on the valve seat.

In such prior devices, difficulty has been encountered in providing seals for the shafts extending to the damping devices on the exterior of the valve body. Also, to balance pressure on some of the damping devices exterior connections were provided. The handling of back flow surges with prior damped check valves resulted in valve movement.

SUMMARY

The present invention relates to an improved damped check valve. The improved check valve includes a valve body, a bonnet, a valve disc pivotally mounted in the body, a damping piston in a cylinder in the bonnet, connected to the valve disc and exposed to the downstream fluids within the valve, all of the moving parts being contained within the body and the bonnet, a reed valve controlled passageway through the piston to allow free opening of the valve disc and damped closing of the valve disc.

An object of the present invention is to provide an improved damped check valve in which there are no packing glands or problems with leakage of fluids to the exterior.

Another object is to provide an improved damped check valve which utilize the fluids flowing therethrough as the damping fluids.

A further object is to provide an improved check valve which pumps itself to its open position during normal pulsating flow.

Still another object of the present invention is to provide an improved damped check valve which allows free controlled movement on opening of the valve member and effectively damps the closing of the valve member.

A still further object of the present invention is to provide an improved damped check valve in which the back flow surge acts on the valve member but is effectively cancelled because it acts also on the damping piston to create substantially the same force.

BRIEF DESCRIPTION OF THE DRAWINGS

These and other objects and advantages of the present invention are hereinafter described and explained with reference to the drawings wherein:

FIG. 3 is a sectional view taken along line 3—3 in FIG. 1.

FIG. 5 is a sectional view taken along line 5—5 in FIG. 1.

DESCRIPTION OF THE PREFERRED EMBODIMENT

Figure 1:
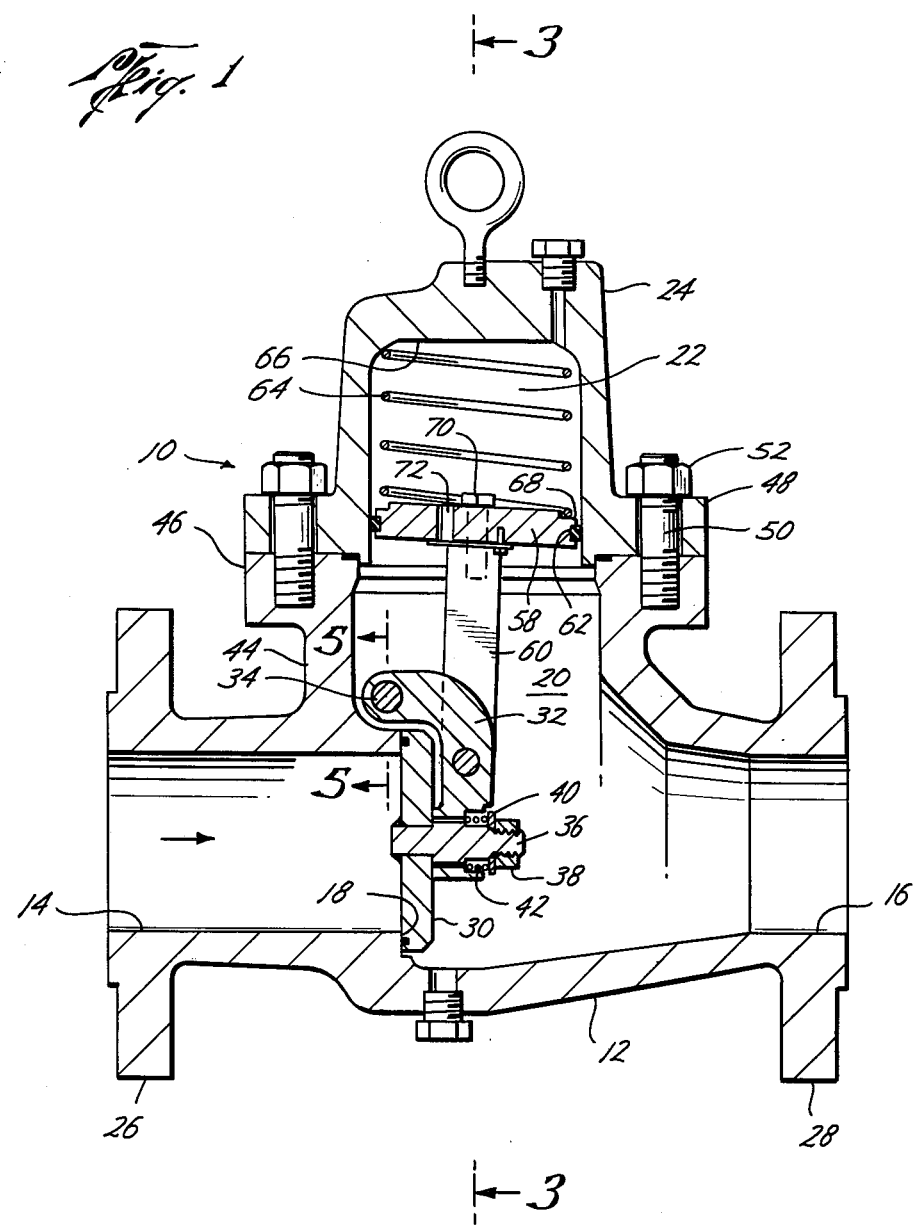
FIG. 1 is a sectional view of the preferred form of damped check valve of the present invention in cross-section.
Figure 2:
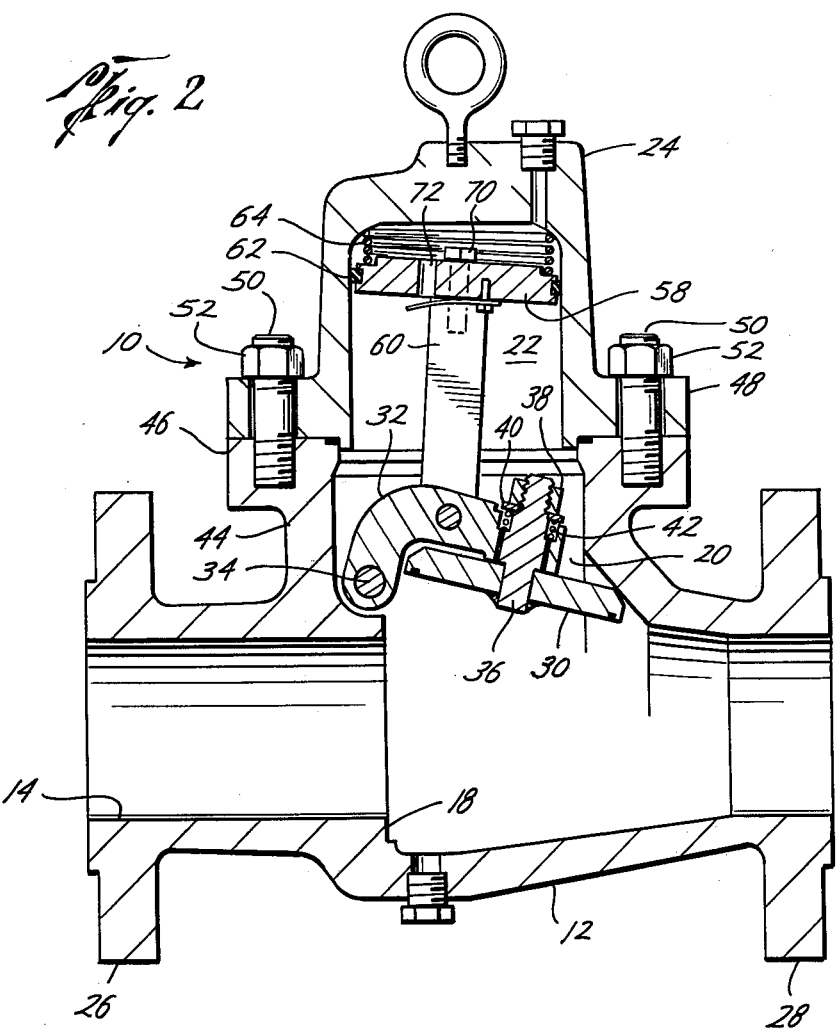
FIG. 2 illustrates the improved check valve of the present invention in full open position.
Figure 4:
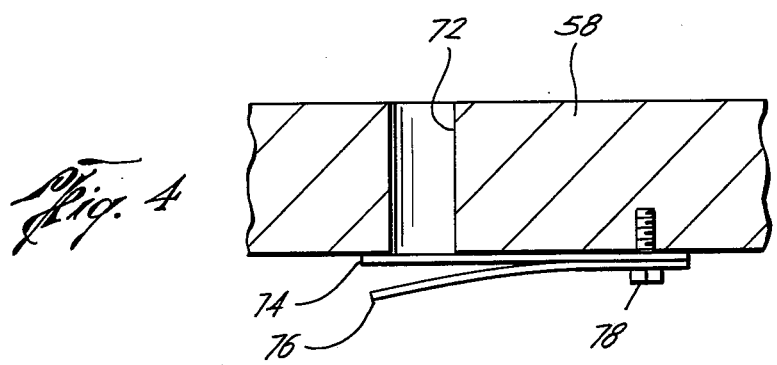
FIG. 4 is a detailed sectional view of the piston port, the vane and the orifice therethrough.

The improved check valve 10 of the present invention is shown in section in FIGS. 1, 2 and 3. It includes the body 12 having an inlet 14, an outlet 16, and a valve seat 18 surrounding communication between the inlet 14 and the outlet 16. Also defined within the body 12 is the valve chamber 20 which is open to the exterior of the body 12 and communicates with the piston cylinder 22 within the bonnet 24 and with the outlet 16. Suitable means such as flanges 26 and 28 are provided for the connection of the check valve 10 to suitable flow line or header (not shown).

The valve disc 30 is provided with suitable mounting means as hereinafter described so that it may move from sealing engagement (closed position) with valve seat 18 to a position out of the flow between the inlet 14 and outlet 16 and within the valve chamber 20 (opened position).

A means is provided for this pivotal movement of valve disc 30 which includes the arm 32 which is pivoted about the pin 34 and is secured to the valve disc 30 by the stud 36, the nut 38, the washer 40 and the spring 42. The pivotal mounting of valve disc 30 by arm 32 allows valve disc 30 to pivot between opened and closed position. The mounting of valve disc 30 on arm 32 allows the valve disc 30 to move into sealing engagement with valve seat 18 but also holds valve disc 30 securely on arm 32 during pulsating flow.

The valve chamber 20 is defined by the tubular walls 44 of body 12 which terminate in flange 46. The flange 48 on bonnet 24 mates with the flange 46 to secure bonnet 24 to the body 12 with suitable fastening means (such as studs 50 and nuts 52) for securing such flanges together. The hinge pin 34 is inserted into the opening 54 in body 12 and is secured in such position by plug 56 and 57, which effectively seal the opening in body 12 and assures that the hinge pin 34 is retained in its desired position for the pivotal mounting of the valve disc 30. Plug 56 may be a part of the pin 34 or keyed thereto as shown in FIG. 5. This structure avoids the problem of providing seals between the interior and exterior of the body because of rotating or reciprocating parts extending through the body by containing all parts within the body and the bonnet.

The piston 58 is positioned within the cylinder 22 of bonnet 24 and is connected to the arm 32 by the connecting rods 60. The seal ring 62 is contoured as shown and has sufficient thickness and resiliency to provide a seal between piston 58 and the walls of cylinder 22 during reciprocation and tilting of piston 58 therein. As may be seen in FIGS. 1, 2 and 3, the seal ring 62 has a substantial thickness with respect to the thickness of the piston 58 and an exterior surface which has an effective radius equal to the radius of the cylinder 22 so that seal ring 62 is held in sealing engagement with the walls of cylinder 32 even though piston 58 is tilted by the movement of valve disc 30 as a result of the connection from valve disc 30 to piston 58. The spring 64 is positioned within cylinder 22 and engages between the closed end of cylinder 22 and the inner surface 68 of piston 58 to bias the piston 58 and the valve disc 30 toward closed position. The bolts 70 extends through piston 58 and are in threaded engagement with the internal threads on the piston end of connecting rods 60.

The pressure on opposite sides of piston 58 are equalized through port 72 which extends through piston 58.

Flow through port 72 is controlled by reed valve 74 which together with reed stop 76 is secured to the valve chamber side of piston 58 by the fastener 78. The reed valve 74 has sufficient flexibility to allow free flow of fluids through port 72 from cylinder 22 to valve chamber 20 and to restrict flow in the opposite direction to provide damping in the closing movement of valve disc 30. Reed valve 74 is prevented from bending too far away from piston 58 by reed stop 76. Reed valve 74 also includes the orifice 80 which allows restricted flow through port 72 during closing movement of valve disc 30 to thereby assure that valve disc 30 closes onto valve seat 18.

It should be noted that the diameter of the piston 58 and the valve disc 30 are substantially the same and the back flow surges which may result from the suction stroke of a compressor or from two or more compressors discharging into a common header are exerted on the valve disc 30 and the piston 58 which creates forces on arm 32 in opposite directions. Thus, the valve disc 30 does not respond to such surges.

By virtue of the relative ease of opening and the damped closing movement of valve disc 30 the valve disc 30 is pumped to a full opened position as shown in FIG. 2 when exposed to normal pulsating flow conditions. This results in very low pressure losses across check valve 10 in normal operation.

The effectiveness of the damping provided by the present invention is improved since the damping piston utilizes the fluids flowing through the check valve as the damping fluid. The use of a reed valve improved the freedom in the opening movement of the valve member and the orifice therethrough assures the closing of the valve member.

What is claimed is:

1. A check valve comprising
   a body having an inlet, an outlet, a seat surrounding communication through said body between said inlet and said outlet, and a valve chamber communicating with said outlet downstream of said valve seat and open to the exterior of said body,
   a valve disc,
   means for pivotally mounting said valve disc within said chamber for movement into and from engagement with said valve seat to control flow therethrough,
   a bonnet having a cylinder defined therein,
   means for securing said bonnet to said body with said cylinder in communication with said valve chamber,
   a piston positioned within said cylinder for reciprocation therein,
   means connecting said piston to said valve disc, the valve disc, its mounting means, the piston and the means connecting the piston to the valve disc being totally enclosed within said body chamber and said bonnet cylinder, and
   means associated with said piston for allowing relatively free movement of said piston responsive to the opening movement of said valve and to restrain the movement of said piston responsive to closing movement of said valve by controlling the flow of fluids from opposite sides of said piston which fluids are the fluids flowing through said valve, said piston is positioned within said cylinder so that fluid pressure downstream of said valve seat is exerted on said piston to urge it in the direction of its movement during opening of said valve disc, the diameter of said piston is substantially the same as the diameter of said valve disc, whereby the movements due to back surge are substantially cancelled.

2. A check valve according to claim 1 wherein said movement controlling means for said piston includes
   a port extending through said piston, and
   a reed valve secured to the valve chamber side of said piston.

3. A check valve according to claim 1, wherein said means connecting said piston to said valve disc includes
   a connecting rod,
   means for pivotally connecting said connecting rod to said valve disc, and
   means for securing said connecting rod to said piston, and including
   a seal ring mounted in surrounding relationship to said piston,
   said seal ring having an outer spherical surface with a radius equal to the radius of said cylinder whereby a seal is maintained between said piston and said cylinder during reciprocation and tilting of said piston in said cylinder.

* * * * *